United States Patent Office 3,095,427
Patented June 25, 1963

3,095,427
HYDROCARBYLTIN SALTS OF EPOXYALKYL-SUBSTITUTED SUCCINIC ACIDS
Robert G. Kelso, St. Albans, W. Va., assignor to Union Carbide Corporation, a corporation of New York
No Drawing. Filed Dec. 3, 1958, Ser. No. 777,841
11 Claims. (Cl. 260—348)

The present invention relates to stabilized vinyl halide resin compositions and to processes for their production. More particularly, the invention is directed to new and improved stabilizing materials which show definite advantage in increasing the resistance to discoloration of both vinyl halide resins and solutions of vinyl halide resins.

As employed herein, the term "vinyl halide resin" is meant to include those resins prepared by the polymerization of a vinyl halide either alone, or in conjunction with other unsaturated polymerizable compounds such as vinylidene chloride, acrylonitrile, styrene, vinyl esters of aliphatic acids, as for instance, vinyl acetate, alkyl esters of mono-olefinic acids, as for instance, dialkyl fumarate and maleate, and the like; and also vinylidene chloride polymer. The vinyl halide concerned with here is ordinarily and preferably the chloride, although the other halides, such as the bromide and fluoride, are also contemplated. The invention is of particular merit when applied to vinyl halide resins prepared by the polymerization of vinyl chloride either alone, or in conjunction with acrylonitrile, vinylidene chloride or both, or with vinyl acetate, as well as those prepared by the copolymerization of vinylidene chloride and acrylonitrile, and especially to those resins containing at least about 15 percent by weight of the halogen-containing monomer.

Vinyl halide resins, in general, are well known to the art, and their valuable properties as components of thermoplastic compositions of various types have been recognized. It is also known that vinyl halide resins are sensitive to both heat and light as manifested by discoloration. By way of illustration, in the compounding and processing of these resins into molded and extruded articles such as synthetic fibers and films, or as constituents of coating compositions, it is usually necessary to subject the resins to elevated temperatures. Under such conditions, a tendency in the resins toward progressive yellowing or darkening is commonly encountered. Moreover, a continued gradual development of color in the resins can generally be observed upon exposure to light or to such elevated temperatures as may be experienced in normal usage.

While the initial stages of color development reached during formation or subsequent treatment of the resins may not materially detract from some of their qualities, many uses of the resins are thereby restricted. Consequently, continued color development in the resins becomes increasingly undesirable. It is therefore expedient to incorporate in vinyl halide resins small amounts of stabilizing materials for the purpose of retarding or inhibiting discoloration.

Heretofore, a considerable number of compounds designed to function as stabilizers for this purpose have been suggested. Prominent among these are organo-metallic compounds such as dioctyltin maleate and dibutyltin dilaurate. Unfortunately, however, many organo-metallic compounds have not been found entirely successful in minimizing the discoloration of vinyl halide resins upon prolonged exposure to the action of either elevated temperature or light. Other efficient stabilizers contribute undesirable side effects which prevent their satisfactory utilization. For example, certain of the organo-metallic compounds, especially those of lower molecular weight, have been found to engender an unpleasant odor in articles produced from the stabilized resins. Still other organo-metallic compounds have been found to be relatively insoluble in the spinning solutions commonly employed in the production of synthetic fibers from vinyl halide resins and are therefore unsuitable for use in minimizing the discoloration of the synthetic fibers.

Accordingly, one or more of the following objects can now be achieved through the practice of the present invention, thus overcoming certain disadvantages of the prior art.

It is an object of this invention to provide vinyl halide resin compositions which show improved resistance to discoloration upon exposure to heat or light. It is another object of the invention to provide novel and improved stabilizing materials which increase the resistance of vinyl halide resins to discoloration upon exposure to heat or light. A further object of the invention is to provide a novel process for retarding or inhibiting the discoloration of vinyl halide resins and solutions of vinyl halide resins upon exposure to heat or light. Still other objects will become apparent in light of the following description.

The invention is based upon the discovery that certain epoxyorganotin succinates, viz. hydrocarbyltin salts of epoxyalkyl-substituted succinic acids, will function as excellent stabilizers for vinyl halide resins. More particularly, the compounds found to be effective as stabilizers for purposes of the invention are the dihydrocarbyltin epoxyalkylsuccinates (I) and bis(trihydrocarbyltin) epoxyalkylsuccinates (II) represented by the general formulae:

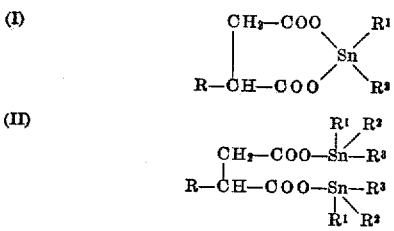

wherein R represents an epoxyalkyl radical containing from about 3 to about 18 carbon atoms and preferably from about 3 to about 12 carbon atoms, as for instance, an epoxypropyl, epoxy-n-butyl, epoxy-2-methylpropyl, epoxypentyl, epoxy-n-hexyl, epoxy-2-ethylbutyl, epoxy-2-methylpentyl, epoxyheptyl, epoxy-n-octyl, epoxy-2-ethylhexyl, epoxynonyl, epoxydecyl, epoxyundecyl, epoxydodecyl, epoxyoctadecyl, radical and the like; and R¹, R² and R³ each represent a hydrocarbyl radical, i.e., a monovalent radical consisting only of carbon and hydrogen atoms, containing from about 3 to about 14 carbon atoms and preferably from about 4 to about 10 carbon atoms, as for instance, an alkyl radical such as a propyl, butyl, isobutyl, sec-butyl, pentyl, isopentyl, n-hexyl, 2-ethylbutyl, 2-methylpentyl, heptyl, n-octyl, 2,2,4-trimethylpentyl, 2-ethylhexyl, nonyl, decyl, undecyl, dodecyl, tetradecyl radical and the like; an aryl radical such as a phenyl, ortho-, meta- or para-tolyl, 2-ethylphenyl radical and the like; an aralkyl radical such as a phenylmethyl, 2-phenylethyl, 2-phenylpropyl, 2-phenylbutyl, 2-phenylhexyl, 2-phenyloctyl radical and the like, etc. It is to be noted that location of the epoxy grouping within the epoxyalkyl radicals is not critical to the invention.

The incorporation of these epoxyorgano-tin succinates in vinyl halide resin compositions as herein described appreciably improves the heat and light stability of the resins to a considerable extent over commonly used and commercially available stabilizes. Moreover, the epoxyorgano-tin succinates of the invention are compatible with vinyl halide resins and are generally soluble in many inert organic solvents for the resins such as those conventionally employed in the preparation of fiber spinning solutions containing the resins, as for example, acetone, acetonitrile, the N,N-dialkyl formamides and acetamides, ethylene carbonate, cyclohexanone and the like. Hence, the stabilizers are also ideally suitable for use in minimizing the discoloration of the fiber spinning solutions. In addition, their solubility in many solvents facilitates spinning operations and avoids the necessity of working with two-phase spinning solutions.

It has been found that by varying the specific nature of the radical designated by R in Formulas I and II above, it is possible to select a particular member from the broad range of epoxyorgano-tin succinates which evidences optimum stabilization properties for a given vinyl halide resin. In this manner, it is also possible to select a particular member which evidences maximum solubility when the stabilizer is to be employed in conjunction with fiber spinning solutions.

The epoxyorgano-tin succinates of the invention can readily be prepared by reacting an epoxyalkylsuccinic anhydride (III) or an epoxyalkylsuccinic acid (IV) represented by the general formulae:

(III) 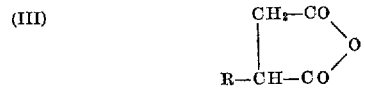

and (IV) 

wherein R has the same meaning hereinbefore defined, with a dihydrocarbyltin oxide (V) represented by the general formula:

(V) 

wherein $R^1$ and $R^2$ have the same meanings hereinbefore defined, so as to obtain a dihydrocarbyltin epoxyalkylsuccinate of the type represented above by Formula I; or with a trihydrocarbyltin hydroxide (VI) or trihydrocarbyltin oxide (VII) represented by the general formulae:

(VI) 

and (VII) 

wherein $R^1$, $R^2$ and $R^3$ have the same meanings hereinbefore defined, so as to obtain a bis(trihydrocarbyltin) epoxyalkylsuccinate of the type represented above by Formula II.

The reaction between the epoxyalkylsuccinic anhydride or epoxyalkylsuccinic acid and the hydrocarbyltin compound is best carried out by bringing into contact and admixing the reactants in any suitable manner, each reactant desirably being in an inert solvent solution such as a benzene or ethylbenzene solution. The reaction mixture is then heated at a temperature such that will facilitate the removal of any water present or formed during the course of reaction. If appreciable quantities of water are associated with either reactant it is also desirable to remove such water prior to reaction. Preferably, a reaction temperature in the range of between about 60° C. and 120° C. is employed, although somewhat higher or lower temperatures may also be used in the process with satisfaction. In addition, it is expedient to incorporate in the reaction mixture an inert diluent which will form an azeotrope with water so that any water formed during the course of reaction can be removed as such an azeotropic mixture. Typical inert diluents suitable for use in this manner include anhydrous hydrocarbons such as benzene, toluene and heptane, dioxane, ketones such as methyl pentyl ketone and the like. The reaction can also be performed without the aid of an azeotrope-forming diluent if the reaction temperature is kept above 100° C. or if an inert gas such as nitrogen is bubbled through the reaction mixture, whereby any water formed is driven off. The reaction is carried out until complete, as indicated, for example, by a cessation in the formation of water of reaction. The reaction product can then be recovered in any convenient manner and subsequently utilized as a stabilizer for vinyl halide resins as herein described. A suitable method of recovery, for instance, lies in the isolation of the product as a residue material following the removal of any remaining inert diluent by conventional methods such as by evaporation or by distillation at elevated temperatures and at atmospheric and reduced pressures.

The preparation of the epoxyorgano-tin succinates of the invention can be illustrated by the following equations showing, by way of example, the preparation of di(2-ethylhexyl)-tin epoxybutylsuccinate from epoxybutylsuccinic anhydride VIII or epoxybutylsuccinic acid IX and di(2-ethylhexyl)tin oxide:

(VIII) 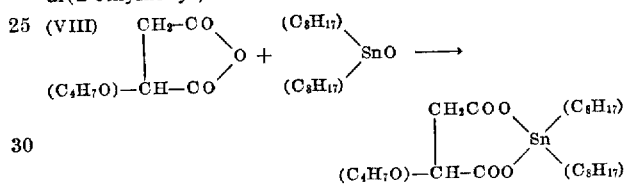

and (IX) 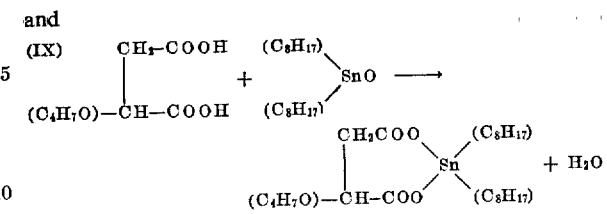

the preparation of bis(triphenyltin) epoxyoctylsuccinate from epoxyoctylsuccinic anhydride (X) or epoxyoctylsuccinic acid (XI) and triphenyltin hydroxide:

(X) 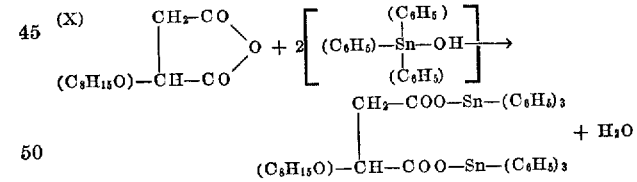

and (XI) 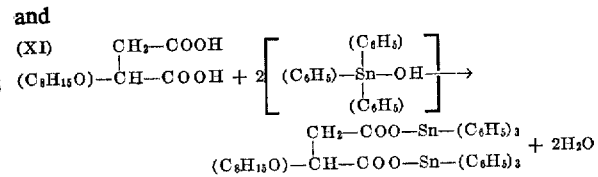

and the preparation of bis(trihexyltin) epoxynonylsuccinate from epoxynonylsuccinic anhydride (XII) or epoxynonylsuccinic acid (XIII) and trihexyltin oxide:

(XII) 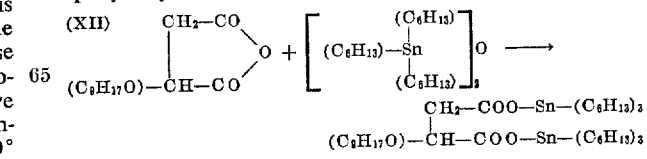

and (XIII) 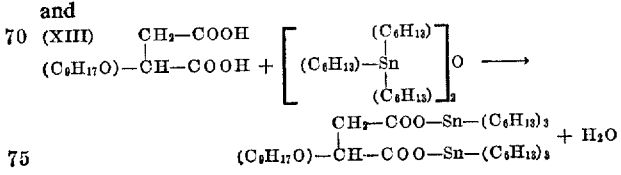

It is to be understood that the radical substituents shown in Equations VIII to XIII can be replaced by any others referred to earlier in connection with Formulas I to VII. In addition it is to be understood that in the case of reaction between an epoxyalkylsuccinic anhydride or epoxyalkylsuccinic acid and a dihydrocarbyltin oxide or trihydrocarbyltin oxide, as represented above by Equations VIII, IX, XII and XIII, the compounds are preferably reacted in equimolar proportions; while the reaction between an epoxyalkylsuccinic anhydride or epoxyalkylsuccinic acid and a trihydrocarbyltin hydroxide, as represented above by Equations X and XI, preferably employs 2 moles of the hydroxide per mole of the anhydride or acid.

In certain instances, for example, as in Reactions VIII and IX, some polymeric material may also be produced and is recovered together with the epoxyorgano-tin succinate. The amount of polymeric material obtained in this manner may vary from about 1 percent up to about 5 percent or more by weight of the product. The presence of such polymer, however, does not adversely influence the effectiveness of the reaction product as a stabilizer. Similarly, some splitting of the epoxide grouping may also occur during production without disadvantage to the invention.

The epoxyalkylsuccinic anhydrides or epoxyalkylsuccinic acids required for reaction with the hydrocarbyltin compounds as hereinabove described may be obtained from any available source. A convenient process for their production, for example, lies in the initial formation of an alkenylsuccinic anhydride intermediate by reactions between maleic anhydride and an olefinic hydrocarbon; such as those disclosed in Flett and Gardner, "Maleic Anhydride Derivatives," by John Wiley and Sons, New York, 1952, pages 4 through 9. This reaction is generally performed at a temperature between about 180° C. and about 250° C. and preferably in the presence of an inert solvent for the reactants such as benzene, toluene, heptane and the like. It is also preferable to add a polymerization inhibitor, as for instance, hydroquinone, to the reaction mixture. The alkenylsuccinic anhydride intermediate is then reacted with peracetic acid at a temperature in the range of between about 10° C. and about 140° C. so as to produce the corresponding epoxyalkylsuccinic anhydride. The latter process is more fully described as the subject matter of U.S. Patent 2,806,860. If desired, the epoxyalkylsuccinic anhydride can subsequently be converted to the corresponding acid by conventional hydrolysis.

It is to be noted that maleic anhydride can be reacted as described above with either a pure olefinic hydrocarbon or with a mixture of olefinic hydrocarbons such as an isomeric mixture of pentenes, hexenes, heptenes, octenes, nonenes, dodecenes, and the like, any of which are commercially available. When reacted with an isomeric mixture of olefinic hydrocarbons, for example, the resulting alkenylsuccinic anhydride or alkenylsuccinic acid, as well as the epoxyorgano-tin succinate subsequently obtained therefrom upon reaction with peracetic acid, will consist of a mixture of compounds, wherein R, defined above in connection with Formulas I to VII, represents an isomeric mixture of epoxyalkyl radicals. The employment of such an epoxyorgano-tin succinate mixture as a stabilizer for vinyl resins is also contemplated by this invention.

The epoxyorgano-tin succinates of the invention are effective as stabilizers when incorporated in vinyl halide resin compositions in concentrations of from about 0.5 percent to about 10 percent based on the weight of the resin. Within this range, an increase in stabilizer concentration generally engenders a higher degree of stability in the resin. Concentrations of from about 2 to about 3 percent by weight of the resin are preferred. While stabilizer concentrations in excess of about 10 percent by weight of the resin can also be employed, attendant disadvantages such as alteration of the physical properties of the resin generally prevents the satisfactory utilization of the stabilized resin compositions thus obtained. On the other hand, when the stabilizer is employed in concentrations of less than about 0.5 percent by weight of the resin, little or no improvement in the stability of the resin may be expected.

The method of incorporating the organic tin succinates in the resin compositions is not critical to the invention. For example, when it is desired to provide stabilized resin solutions such as those in common usage as spinning "dopes" for the production of synthetic fibers, the epoxyorgano-tin succinates which are useful as stabilizers are preferably added to the resin solvent prior to the addition of resin. However, the stabilizers can also be added during or following the dissolution of the resin in the solvent. The solution containing the resin and stabilizer can then be extruded from a spinnerette by conventional means, for example, into a hot air or liquid bath, thus forming stabilized filaments of the resin that incorporate the epoxyorgano-tin succinate as an intimate mixture.

The stabilized resin solutions prepared in accordance with this invention evidence substantially reduced discoloration during fiber spinning operations, thus resulting in the production of synthetic fibers leaving a high degree of initial whiteness and low color. In addition, the presence of the stabilizing materials in the fibers so produced thereby inhibits discoloration when the fibers are subjected to high temperatures or exposed to light. Bleaching of the fibers during early exposure periods to light, heretofore frequently encountered with certain vinyl halide resins, is also substantially eliminated.

The epoxyorgano-tin succinate and the resin can also be milled together, and the homogeneous mixture that results can then be molded, extruded or otherwise formed into stabilized plastic articles such as film, sheet, tubes and the like.

The utility and advantages of the stabilizers of the invention, as well as of the resin compositions stabilized therewith, will further become apparent from the following examples which are included to illustrate the practice of the invention.

EXAMPLE 1

To a round-bottomed glass flask equipped with a stirrer, thermometer and decanting-distillation head were charged the following: 85.4 grams (0.38 mole) of epoxyoctylsuccinic anhydride dissolved in 172.4 grams of ethylbenzene, 131 grams (0.36 mole) of di(2-ethylhexyl)tin oxide dissolved in 238 grams of benzene and 200 cubic centimeters of additional benzene. The reaction mixture was stirred and heated with reflux at a temperature maintained in the range of between 90° C. and 100° C. During a 65 minute reflux period, a small amount of water was removed, followed by a partial stripping of benzene. The residual solution was then poured into an evaporating dish and placed in a vacuum oven at a temperature of 100° C. to remove the remaining solvent. Di(2-ethylhexyl)tin epoxyoctylsuccinate was thus obtained in an essentially quantitative yield as a light brown, viscous liquid which exhibited solubility in acetone. Chemical analysis of the product indicated a tin content of 19.2 percent by weight (theoretical: 20.2 percent).

EXAMPLE 2

To a round-bottomed glass flask equipped with a stirrer, thermometer and decanting distillation head were charged the following: 49.8 grams (0.25 mole) of epoxyhexylsuccinic anhydride dissolved in 121.5 grams of ethylbenzene, 90.3 grams (0.25 mole) of di(2-ethylhexyl)tin oxide dissolved in 164 grams of benzene and 100 cubic centimeters of additional benzene. The reaction mixture was stirred and brought to reflux at a temperature of between 90° C. and 100° C. During a 65 minute reflux period, a small amount of water was removed, followed by a partial stripping of benzene. The residual solution was then poured into an evaporating dish and placed in a vacuum oven at a temperature of 100° C. to remove the remaining solvent. Di(2-ethylhexyl)tin epoxyhexylsuccinate was thus obtained in an essentially quantitative yield as a dark brown, viscous liquid which exhibited solubility in acetone and in dimethylformamide. Chemical analysis of the product indicated a tin content of 20.2 percent by weight (theoretical: 21.2 percent).

EXAMPLE 3

A solution containing 90.3 grams (0.25 mole) of di(2-ethylhexyl)tin oxide dissolved in 164 grams of benzene and 200 cubic centimeters of additional benzene were charged to the apparatus described in Example 1. The charge was heated with reflux at a temperature maintained in the range of from 90° C. to 100° C. for a period of about 2 hours, during which time a small amount of water was removed as an azetrope with benzene. The solution in the reactor was cooled and a solution containing 42.7 grams (0.25 mole) of epoxybutylsuccinic anhydride dissolved in 83.8 grams of ethylbenzene added thereto. The reaction mixture was stirred and heated with reflux at a temperature maintained in the range of between 90° C. and 100° C. During a 65 minute reflux period, a small amount of water was removed, followed by a partial stripping of benzene. The residual solution was then poured into an evaporating dish and placed in a vacuum oven at a temperature of 100° C. to remove the remaining solvent. Di-(2-ethylhexyl)tin epoxybutylsuccinate was thus obtained in essentially quantitative yield as a light brown, viscous liquid which exhibited solubility in acetone. Chemical analysis of the product indicated a tin content of 22.1 percent by weight (theoretical: 22.3 percent).

EXAMPLE 4

To a round-bottomed, jacketed, glass flask fitted with a stop cock drain and equipped with a stirrer, thermowell and a condenser with a decanting head were charged the following: 148.9 grams (0.25 mole) of tributyltin oxide, 56.8 grams (0.25 mole) of epoxyoctylsuccinic anhydride dissolved in 57.8 grams of ethylbenzene and 400 cc. of benzene. The reaction mixture was stirred and heated by the introduction of steam to the jacket surrounding the glass flask. Within 5 minutes after heating, the temperature of the reaction mixture reached 70° C., at which point water appeared in the decanting head as the lower layer of a benzene-water azeotrope. Within 20 minutes, the temperature of the reaction mixture reached 87° C. and was maintained at this level for an additional period of one hour. During the reaction period 4.5 cc. of water were collected. The remaining solvent was then removed from the crude reaction product by stripping under reduced pressure at a maximum temperature of 95° C. Bis(tributyltin)epoxyoctylsuccinate was thus obtained in an essentially quantitative yield as a yellow, viscous liquid having a refractive index ($n_D^{20}$) of 1.4934, a density of 1.111 at a temperature of 29° C. and a Gardner color of 4. The product exhibited complete solubility in acetone and a solubility of about 9.0 percent in acetonitrile. Chemical analysis of the product indicated a tin content of 26.9 percent by weight (theoretical: 28.7 percent).

EXAMPLE 5

To a round-bottomed, jacketed, glass flask fitted with a stop cock drain and equipped with a stirrer, thermowell and a condenser with a decanting head were charged the following: 146.8 grams (0.4 mole) of triphenyltin hydroxide, 39.8 grams (0.2 mole) of epoxyhexylsuccinic anhydride dissolved in 57.3 grams of ethylbenzene and 400 cc. of benzene. The reaction mixture was stirred and heated by the introduction of steam to the jacket surrounding the glass flask. Within 5 minutes after heating, the temperature of the reaction mixture reached 70° C., at which point water appeared in the decanting head as the lower layer of a benzene-water azeotrope. Within 20 minutes, the temperature of the reaction mixture reached 87° C. and was maintained at this level for an additional period of one hour. During the reaction period 45 cc. of water were collected. The solvent and remaining diluent were then removed from the crude reaction product by stripping under reduced pressure at a maximum temperature of 95° C. Bis(triphenyltin)epoxyhexylsuccinate was thus obtained in an essentially quantitative yield as a tan-colored solid having a melting point of from 51° C. to 52° C. The product exhibited a solubility of about 85 percent in both acetone and acetonitrile. Chemical analysis of the product indicated a tin content of 23.8 percent by weight (theoretical: 25.9 percent).

EXAMPLE 6

A mixture consisting of 150 grams of a vinyl chloride-acrylonitrile-vinylidene chloride terpolymer resin 450 grams of acetonitrile and 3 grams of di(2-ethylhexyl)tin expoxyoctylsuccinate was slurried at room temperature in a jacketed vessel equipped with a stirrer. The resin employed contained 21.1 percent by weight of chlorine, 16.6 percent by weight of nitrogen and had a molecular weight such that an 0.2 percent solution of the resin in dimethylformamide at a temperature of 29° C. had a specific viscosity of 0.403. The temperature of the slurry was raised to 70° C. with stirring to dissolve the resin and produce a homogeneous solution. The vessel was sealed and the solution then forced through a filtration system and metered to a spinnerette consisting of 60 jets or holes each 0.1 millimeter in diameter. The filaments formed in this manner were extruded at the rate of 25 feet per minute into a coagulating bath consisting of a mixture of water and acetonitrile in a ratio of 85 parts of water to 15 parts of acetonitrile by weight, the bath having a specific gravity of 0.942 at a temperature of 70° C., and which was maintained at a temperature of 70° C. during filament extrusion. The yarn (bundle of filaments) was withdrawn from the coagulating bath at a rate of 28 feet per minute onto a Godet system and washed with water at a temperature of 60° C. The yarn was then withdrawn from the Godet system at the rate of 112 feet per minute (stretched 300 percent) onto a metal bobbin operating in an oven at a temperature of 95° C. The yarn was tested for light stability by measuring the percent reflectance of filtered "blue light," having a wavelength peak of 435 millimicrons, from a knit fabric prepared from the yarn. Readings were taken initially and after 20-hour intervals of exposure to ultra-violet light in an Atlas Fade-Ometer at a temperature of 145° F. for a total exposure period of 80 hours. The readings, indicating changes in color, were measured using a Colormaster Differential Colormeter, model 4 manufactured by the Manufactures Engineering and Equipment Corp., Hatboro, Pa. and equipped with a tristimulus "Z" filter. The results obtained are set forth below in Table A, wherein "reflectance values" represent the percent monochromatic light reflectance of the yarn after exposure in the Atlas Fade-Ometer for the indicated periods of time. High reflectance values, denoting less color in the yarn, are preferred. Also tabulated is the percent drop in light reflectance after 80 hours exposure, calculated as follows:

$$\frac{\text{Reflectance value (0 hours)} - \text{reflectance value (80 hours)} \times 100}{\text{Reflectance value (0 hours)}}$$

= percent drop in reflectance (after 80 hours)

Also included in the table for comparison are the results obtained from yarn prepared and exposed to light by the same operations, in which, however, no stabilizer was incorporated.

Table A

|  | Reflectance values | | | | | Percent drop in reflectance |
|---|---|---|---|---|---|---|
|  | 0 hrs. | 20 hrs. | 40 hrs. | 60 hrs. | 80 hrs. |  |
| Unstabilized yarn | 59.2 | 16.3 | 11.0 | 8.9 | 7.1 | 88.0 |
| Stabilized yarn | 63.5 | 62.8 | 61.8 | 60.2 | 59.5 | 6.3 |

The effectiveness of the expoxyorgano-tin succinate as a stabilizer for vinyl halide resins is readily apparent from the above table. It can be seen, for example, that the yarn stabilized in accordance with the invention evidenced improved initial color. Moreover, the stabilized yarn showed considerably less discoloration with time, i.e., lower percent drop in reflectance values, when exposed to light as compared with yarn containing no stabilizer. Even after 80 hours of exposure to light, the stabilized yarn evidenced less color than did unstabilized yarn prior to such exposure.

The unstabilized and stabilized yarn was also tested for heat stability by scorching a sample of knit fabric prepared from the yarn at a temperature of 185° C. for 30 seconds and measuring the percent reflectance of filtered "blue light," having a wavelength peak of 435 millimicrons, in a manner similar to that described above, before and after scorching. The increase in color after scorching was then calculated in terms of $\Delta K/S$ values, according to the Kubela-Munk relationship, discussed, for example, in "Color in Business, Science and Industry," D. B. Judd, Wiley and Sons, 1952. The $\Delta K/S$ values were calculated as follows:

$$\Delta K/S = \frac{(1-R_f)^2}{2R_f} - \frac{(1-R_0)^2}{2R_0}$$

wherein $R_0$ is the initial reflectance of the yarn, i.e., the percent reflectance before scorching, and $R_f$ is the reflectance of the yarn after scorching. The results obtained are set forth below in Table B. In the table, $\Delta K/S$ values have been multiplied by a factor of 100 to provide convenient numbers for comparison.

Table B

|  | $\Delta K/S \times 100$ |
|---|---|
| Unstabilized yarn | 13.9 |
| Stabilized yarn | 8.2 |

From the above table it can be seen that the unstabilized yarn showed an undesirably greater increase in color after exposure to elevated temperatures than did the yarn stabilized in accordance with the invention.

EXAMPLE 7

From a solution consisting of 150 grams of a vinyl chloride-acrylonitrile-vinylidene chloride, terpolymer resin, 450 grams of acetonitrile and 3 grams of di(2-ethylhexyl)tin epoxybutylsuccinate 3-denier yarn was prepared by extrusion, coagulation, drying, stretching and annealing procedures in accordance with conventional fiber spinning techniques. The resin employed contained 21.5 percent by weight of chlorine, 17.35 percent by weight of nitrogen, and had a molecular weight such that an 0.2 percent solution of the resin in dimethyl-formamide at a temperature of 29° C. had a specific viscosity of 0.377. The yarn was then knitted, pressed into flat pads and tested for light stability by measuring the percent reflectance therefrom of filtered "blue light" having a wavelength peak of 445 millimicrons after exposure to ultra-violet light in an Atlas Fade-Ometer at a temperature of 145° F. Readings were taken initially and after 20-hour intervals of exposure for a total period of 80 hours. The readings were measured using a Photoelectric Reflection Meter, model 610, manufactured by the Photovolt Corp., New York city, N.Y. The results obtained are tabulated below in Table C. Also included in the table, for comparison, are the results obtained from yarn prepared and exposed to light by the same operations, in which, however, either no stabilizer was incorporated or in which a conventional stabilizer, viz. di(2-ethylhexyl) tin maleate, was substituted for the stabilizer of the invention.

Table C

| Stabilizer | Reflectance values | | | | | Percent drop in reflectance |
|---|---|---|---|---|---|---|
|  | 0 hrs. | 20 hrs. | 40 hrs. | 60 hrs. | 80 hrs. |  |
| None | 52.0 | 38.0 | 28.5 | 24.0 | 21.5 | 58.7 |
| Di(2-ethylhexyl)tin maleate | 58.0 | 57.0 | 55.0 | 48.5 | 47.0 | 19.0 |
| Di(2-ethyl-hexyl)tin epoxybutyl-succinate | 60.0 | 56.0 | 54.5 | 53.0 | 53.0 | 11.7 |

The unstabilized and stabilized yarn were also tested for heat stability by scorching flat pads prepared from the yarn at a temperature of 150° C. for thirty minutes and measuring the percent reflectance of filtered "blue light" in a manner similar to that described above, before and after scorching. The results obtained are tabulated below in Table D, and serve to indicate the improved heat stability of stabilized yarn prepared in accordance with the invention.

Table D

| Stabilizer: | Reflectance values |
|---|---|
| None | 44 |
| Di(2-ethylhexyl)tin maleate | 44 |
| Di(2-ethylhexyl)tin epoxybutylsuccinate | 48 |

EXAMPLE 8

From a solution consisting of 12 pounds of a vinyl chloride-acrylonitrile copolymer resin, 32 pounds of acetone and 110 grams of di(2-ethylhexyl)tin epoxybutylsuccinate 3-denier yarn was prepared by extrusion, coagulation, stretching and drying procedures in accordance with conventional fiber spinning techniques. The resin employed contained 59.6 percent by weight of vinyl chloride and 40.4 percent by weight of acrylonitrile, and had a molecular weight such that an 0.2 percent solution of the resin in cyclohexanone at a temperature of 20° C. had a specific viscosity of 0.261. The yarn was then pressed into flat pads and tested for light stability by measuring the percent reflectance therefrom of monochromatic light having a wavelength of 440 millimicrons. Readings were taken initially and after 20-hour intervals of exposure to ultra-violet light in an Atlas Fade-Ometer at a temperature of 145° F. for a total exposure period of 80 hours. The readings were measured using a General Electric Co. Recording Spectrophotometer, Catalog No. 5662004. The results obtained are tabulated below in Table E. Also included in the table, for comparison, are the results obtained from yarn prepared and exposed to light by the same operations, in which, however, no stabilizer was employed.

Table E

|  | Reflectance values | | | | | Percent drop in reflectance |
|---|---|---|---|---|---|---|
|  | 0 hrs. | 20 hrs. | 40 hrs. | 60 hrs. | 80 hrs. |  |
| Unstabilized yarn | 68 | 38 | 30 | 25 | ---- | [1] 63.3 |
| Stabilized yarn | 69 | 72 | 67 | 61 | 55 | 20.3 |

[1] After 60 hours exposure to ultra-violet light.

EXAMPLE 9

From a solution consisting of 210 grams of a vinylidene chloride-acrylonitrile copolymer resin, 540 grams of acetonitrile and 4.2 grams of di(2-ethylhexyl)tin epoxyoctylsuccinate, 3-denier yarn was prepared by extrusion, coagulation, drying and stretching procedures in accordance with conventional fiber spinning techniques. The resin employed contained 54 percent by weight of acrylonitrile and 46 percent by weight of vinylidene chloride, and had a molecular weight such that an 0.2 percent solution of the resin in cyclohexanone at a temperature of 29° C. had a specific viscosity of 0.254. The yarn was then knitted and tested for light stability by measuring the percent reflectance of filtered "blue light" having a wavelength peak of 435 millimicrons from the knit fabric. After exposure to ultra-violet light in an Atlas Fade-Ometer at a temperature of 145° F. Readings were taken initially and after 20-hour intervals of exposure for a total period of 80 hours. The readings were measured using a Colormaster Differential Colormeter. The results obtained are tabulated below in Table F. Also included in the table are the results obtained from yarn prepared and exposed to light by the same operations, in which, however, in one instance, an equal weight of (4.2 grams) di(2-ethylhexyl)tin epoxybutylsuccinate was substituted as the stabilizer, and, in another instance, for comparison, no stabilizer was employed.

*Table F*

| Stabilizer | Reflectance values | | | | | Percent drop in reflectance |
|---|---|---|---|---|---|---|
| | 0 hrs. | 20 hrs. | 40 hrs. | 60 hrs. | 80 hrs. | |
| None | 64.5 | 39.7 | 33.6 | 30.4 | 27.8 | 56.9 |
| Di(2-ethyl-hexyl)tin epoxyoctylsuccinate | 62.4 | 55.7 | 50.8 | 43.6 | 37.7 | 39.6 |
| Di(2-ethyl-hexyl)tin epoxybutylsuccinate | 69.3 | 62.9 | 56.9 | 51.1 | 40 | 42.3 |

The unstabilized and stabilized yarn were also tested for heat stability by scorching flat pads prepared from the yarn at a temperature of 170° C. for one hour and measuring the percent reflectance of filtered "blue light" in a manner similar to that described above, before and after scorching. The results obtained are tabulated below in Table G.

*Table G*

Stabilizer:                            $\Delta K/S \times 10$
None ---------------------------------- 22.4
Di(2-ethylhexyl)tin epoxyoctylsuccinate ------ 15.0
Di(2-ethylbutyl)tin epoxyhexylsuccinate ------ 17.2

EXAMPLE 10

From a solution consisting of 150 grams of a vinyl chloride-vinylidene chloride-acrylonitrile terpolymer resin, 450 grams of acetonitrile and 3 grams of bis(tributyltin)epoxyoctylsuccinate, 3-denier yarn was prepared by extrusion, coagulation, drying and stretching procedures in accordance with conventional fiber spinning techniques. The resin employed contained 21.1 percent by weight of chlorine, 16.6 percent by weight of nitrogen and had a molecular weight such that an 0.2 percent solution of the resin in dimethylformamide at a temperature of 29° C. had a specific viscosity of 0.403. The yarn was then knitted and tested for light stability by measuring the reflectance of filtered "blue light" having a wavelength peak of 435 millimicrons from the knit fabric. After exposure to ultra-violet light in an Atlas Fade-Ometer at a temperature of 145° F., readings were taken initially and after 20-hour intervals of exposure for a total period of 80 hours. The readings were measured using a Colormaster Differential Colormeter. The results obtained are tabulated below in Table H. Also included in the table are the results obtained from yarn prepared and exposed to light by the same operations, in which, however, in one instance, an equal weight of (3 grams) a bis(triphenyltin)epoxyhexylsuccinate was substituted as the stabilizer, and, in another instance, for comparison, no stabilizer was employed.

*Table H*

| Stabilizer | Reflectance values | | | | | Percent drop in reflectance |
|---|---|---|---|---|---|---|
| | 0 hrs. | 20 hrs. | 40 hrs. | 60 hrs. | 80 hrs. | |
| None | 59.2 | 16.3 | 11.0 | 8.9 | 7.1 | 88.0 |
| Bis(tributyl-tin)epoxyoctylsuccinate | 56.2 | 53.2 | 46.8 | 40.5 | 36.0 | 35.9 |
| Bis(triphenyl-tin)epoxyhexylsuccinate | 63.3 | 62.6 | 62.0 | 57.6 | 54.6 | 13.7 |

The unstabilized and stabilized yarn were also tested for heat stability by scorching flat pads prepared from the yarn at a temperature of 170° C. for 6 minutes and measuring the percent reflectance of filtered "blue light" in a manner similar to that described above, before and after scorching. The results obtained are tabulated below in Table I.

*Table I*

Stabilizer:                            $\Delta K/S \times 10$
None ---------------------------------- 31.9
Bis(tributyltin)epoxyoctylsuccinate --------- 21.3
Bis(triphenyltin)epoxyhexylsuccinate -------- 17.2

EXAMPLE 11

To determine the heat stability of vinyl halide resin solutions stabilized in accordance with the invention, 24 grams of acetone were introduced to a Pyrex bomb and cooled by placing the bomb in an acetone-"Dry Ice" bath until the temperature of the acetone reached approximately −20° C. Six-tenths of a gram of a di(2-ethylhexyl)tin epoxybutylsuccinate obtained in a manner similar to that previously described in Example 3 was then dissolved in the acetone, and to this cooled solution, 6 grams of a copolymer resin of vinyl chloride and acrylonitrile were added. The resin employed contained 59.6 percent vinyl chloride and 40.4 percent acrylonitrile and had a molecular weight such that an 0.2 percent solution of the resin in cyclohexanone at a temperature of 29° C. had a specific viscosity of 0.261. The bomb was then capped, enclosed in a protective fabric bag and placed in a tumbling water bath at a temperature of 50° C. for about 30 minutes to effect solvation of the resin. Heating was continued for two hours at a temperature of 80° C. whereby a clear resin solution was obtained containing 20 percent solids and suitable for the spinning of synthetic fibers. The color of the resin solution was measured in terms of "Gardner color values" with lower Gardner values, corresponding to less colored solutions, being preferred. For comparison, the experiment was also repeated in the absence of a stabilizer. The results obtained are set forth below in Table J.

*Table J*

Gardner value
Unstabilized solution ---------------------------- 8
Stabilized solution ------------------------------ 6

Those resin solutions having higher resistance to discoloration possess lower Gardner values. Hence, from the above table, the improved resistance to discoloration of solutions containing vinyl halide resins and stabilized in accordance with the invention is readily apparent.

EXAMPLE 12

A mixture containing 100 grams of a vinyl chloride-vinyl acetate copolymer resin, 45 grams of dioctyl pthalate as a plasticizer and 2 grams of di(2-ethylhexyl)tin epoxybutylsuccinate was milled on a high-speed mill maintained at a temperature of 170° C. The resin employed contained 97.7 percent by weight of vinyl chloride and 2.3 percent by weight of vinyl acetate and had a molecular weight such that an 0.2 percent solution of the resin in nitrobenzene at a temperature of 20° C. had a specific viscosity of 0.203. The resin composition was tested for heat stability by taking samples thereof during milling at various intervals of time using plaquing pliers, and measuring the percent reflectance of monochromatic light having a wavelength of 450 millimicrons from the samples or plaques. Readings, indicating changes in color, were measured using a General Electric Recording Spectrophotometer. For comparison, the experiment was repeated substituting an equal weight 2.0 grams of a commonly employed stabilizer, di(butyltin)dilaurate, for the stabilizer of the invention. The results obtained are tabulated below in Table K.

Table K

| Stabilizer | Reflectance values | | | | | | |
|---|---|---|---|---|---|---|---|
| | 1 min. | 3 min. | 5 min. | 7 min. | 9 min. | 11 min. | 13 min. |
| Di(2-ethyl-hexyl(tin epoxybutyl-succinate... | 57 | 44 | 28 | 20 | 18 | 21 | 19 |
| Di(butyltin)-dilaurate... | 56 | 40 | 31 | 25 | 21 | 12 | 7 |

As higher "reflectance values" denote less color, it can be seen from the above table that the milled samples stabilized in accordance with this invention demonstrated improved heat stability.

EXAMPLE 13

Mixtures containing 297 grams of vinyl chloride-vinyl acetate copolymer resin, 1.5 grams of stearic acid as a lubricant and varying proportions of bis(tributyltin)epoxyoctylsuccinate were milled for a total time of 3 minutes on a two-roll mill heated to a temperature of 115° C., and formed into sheets.

The resin employed contained 86.6 percent by weight of vinyl chloride and 13.4 percent by weight of vinyl acetate, and had a molecular weight such that a 1.0 percent solution of the resin in methyl isobutyl ketone had a specific viscosity of 0.568. The resulting sheets, one-sixteenth of an inch in thickness, were cut into 1 inch squares. The squares were laid on glass plates which were then placed in a circulating air oven maintained at a temperature of 135° C. Heat stability measurements were carried out as follows. Sample squares were removed at intervals, mounted on cardboard in succession below an unheated square which served as a blank and were rated visually. The effectiveness of the stabilizer was represented by the number of minutes required to produce a marked blackening of the squares. The more stable the resin, the longer was the period of time required to produce blackening.

The results obtained are tabulated below in Table L. Results obtained utilizing bis(triphenyltin)epoxyhexylsuccinate, and, for comparison, no stabilizer is also included in the table. In the table, the concentration of stabilizer is indicated as percent by weight of resin; the time required to produce blackening is tabulated in minutes.

Table L

| Stabilizer | Concentration of stabilizer | Time required to produce blackening |
|---|---|---|
| None | 0 | 10 |
| Bis(tributyltin)epoxyoctylsuccinate | 1.0 | 140 |
| | 2.0 | 160 |
| | 5.0 | 570 |
| Bis(triphenyltin)epoxyhexylsuccinate | 1.0 | 60 |
| | 2.0 | 100 |
| | 5.5 | 360 |

From the above table it can be seen that the vinyl halide resins stabilized in accordance with the invention are more heat stable, i.e., less susceptible to degradation as evidenced by blackening, than similar resins which, however, are unstabilized. Moreover, it is to be observed that by increasing the concentration of stabilizer within the range prescribed by the invention a corresponding increase in stability can generally be achieved in the vinyl halide resins.

EXAMPLE 14

In a manner similar to that described above in Example 13, samples of another resin, viz. a polyvinyl chloride resin, with and without stabilizers were milled into sheets. The resin employed had a molecular weight such that an 0.2 percent solution of the resin in nitrobenzene at a temperature of 20° C. had a specific viscosity of 0.185. The milling operations were performed using 210 grams of resin, 1.5 grams of stearic acid as a lubricant and varying proportions of stabilizer. The sheets thereby obtained were cut into one-inch squares and placed in test tubes having a small hole in the bottom of each tube. The tubes containing the squares were then suspended in a mineral oil bath maintained at a temperature of 135° C. Heat stability measurements were determined as described above in Example 13 and the results obtained tabulated below in Table M.

| Stabilizer | Concentration of stabilizer | Time required to produce blackening |
|---|---|---|
| None | 0 | 240 |
| Bis(tributyltin)epoxyoctylsuccinate | 1.0 | 2,160 |
| | 2.0 | 2,760 |
| Bis(triphenyltin)epoxyhexylsuccinate | 1.0 | 840 |

What is claimed is:
1. The dihydrocarbyltin epoxyalkylsuccinate of the formula:

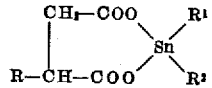

wherein R is epoxyalkyl of from about 3 to about 18 carbon atoms and one oxygen atom attached to vicinal carbon atoms thereof, and $R^1$ and $R^2$ each is a hydrocarbyl selected from the group consisting of alkyl of from about 3 to about 14 carbon atoms, aryl of from 6 to about 14 carbon atoms, and aralkyl of from 7 to about 14 carbon atoms.

2. The dihydrocarbyltin epoxyalkylsuccinate of the formula:

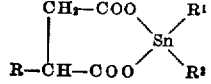

wherein R is epoxyalkyl of from about 3 to about 18 carbon atoms and one oxygen atom attached to vicinal carbon atoms thereof, and $R^1$ and $R^2$ each is alkyl of from about 3 to about 14 carbon atoms.

3. The dihydrocarbyltin epoxyalkyl substituted succinate of the formula:

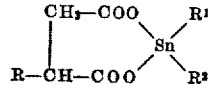

wherein R is epoxyalkyl of from about 3 to about 18 carbon atoms and one oxygen atom attached to vicinal carbon atoms and one oxygen atom attached to vicinal carbon to about 14 carbon atoms.

4. The bis(trihydrocarbyltin)epoxyalkylsuccinate of the formula:

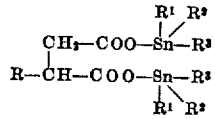

wherein R is epoxyalkyl of from about 3 to about 18 carbon atoms and one oxygen atom attached to vicinal carbon atoms thereof, and $R^1$, $R^2$ and $R^3$ each is a hydrocarbyl selected from the group consisting of alkyl of from about 3 to about 14 carbon atoms, aryl of from 6 to about 14 carbon atoms, and aralkyl of from 7 to about 14 carbon atoms.

5. The bis(trihydrocarbyltin)epoxyalkylsuccinate of the formula:

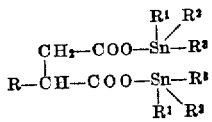

wherein R is epoxyalkyl of from about 3 to about 18 carbon atoms and one oxygen atom attached to vicinal carbon atoms thereof, and $R^1$, $R^2$ and $R^3$ each is alkyl of from about 3 to about 14 carbon atoms.

6. The bis(trihydrocarbyltin)epoxyalkylsuccinate of the formula:

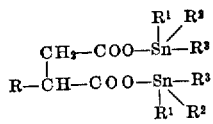

wherein R is epoxyalkyl of from about 3 to about 18 carbon atoms and one oxygen atom attached to vicinal carbon atoms thereof, and $R^1$, $R^2$ and $R^3$ each is aryl of from 6 to about 14 carbon atoms.

7. Dioctyltin epoxybutylsuccinate of the formula:

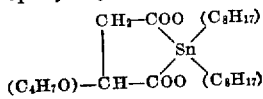

wherein the oxygen atom of $(C_4H_7O)$— is attached to vicinal carbon atoms thereof.

8. Dioctyltin epoxyhexylsuccinate of the formula:

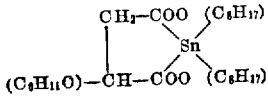

wherein the oxygen atom $(C_6H_{11}O)$— is attached to vicinal atoms thereof.

9. Dioctyltin epoxyoctylsuccinate of the formula:

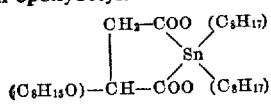

wherein the oxygen atom of $(C_8H_{15}O)$— is attached to vicinal carbon atoms thereof.

10. Bis(tributyltin)epoxyoctylsuccinate of the formula:

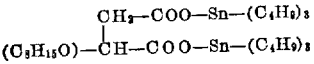

wherein the oxygen atom of $(C_8H_{15}O)$— is attached to vicinal carbon atoms thereof.

11. Bis(triphenyltin)epoxyhexylsuccinate of the formula:

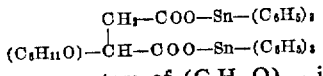

wherein the oxygen atom of $(C_6H_{11}O)$— is attached to vicinal atoms thereof.

References Cited in the file of this patent

UNITED STATES PATENTS

| | | |
|---|---|---|
| 2,307,092 | Yngve | Jan. 5, 1943 |
| 2,464,137 | Levy et al. | Mar. 8, 1949 |
| 2,555,169 | Voorthuis | May 29, 1951 |
| 2,560,034 | Eberly | July 10, 1951 |
| 2,745,846 | Dazzi | May 14, 1956 |
| 2,770,610 | Hardy et al. | Nov. 13, 1956 |
| 2,806,860 | Phillips et al. | Sept. 17, 1957 |
| 2,838,554 | Gloskey | June 10, 1958 |
| 2,910,452 | Crauland | Oct. 27, 1959 |
| 2,972,595 | Barley et al. | Feb. 21, 1961 |

FOREIGN PATENTS

| | | |
|---|---|---|
| 791,119 | Great Britain | Feb. 26, 1958 |

UNITED STATES PATENT OFFICE
CERTIFICATE OF CORRECTION

Patent No. 3,095,427 June 25, 1963

Robert G. Kelso

It is hereby certified that error appears in the above numbered patent requiring correction and that the said Letters Patent should read as corrected below.

Column 14, lines 64 and 65, for "and one oxygen atom attached to vicinal carbon to about 14 carbon atoms" read -- thereof, and $R^1$ and $R^2$ each is aryl of from 6 to about 14 carbon atoms --.

Signed and sealed this 14th day of April 1964.

(SEAL)
Attest:

ERNEST W. SWIDER
Attesting Officer

EDWARD J. BRENNER

Commissioner of Patents